(12) United States Patent  
Huang

(10) Patent No.: US 9,264,644 B2  
(45) Date of Patent: Feb. 16, 2016

(54) ANALOG-TO-DIGITAL CONVERSION FOR IMAGE SENSOR WITH NON-DESTRUCTIVE READ PIXEL

(71) Applicant: Forza Silicon Corporation, Pasadena, CA (US)

(72) Inventor: Steven Huang, Pasadena, CA (US)

(73) Assignee: FORZA SILICON CORPORATION, Pasadena, CA (US)

(*) Notice: Subject to any disclaimer, the term of this patent is extended or adjusted under 35 U.S.C. 154(b) by 0 days.

(21) Appl. No.: 14/262,692

(22) Filed: Apr. 25, 2014

(65) Prior Publication Data

US 2014/0320716 A1  Oct. 30, 2014

Related U.S. Application Data

(60) Provisional application No. 61/816,128, filed on Apr. 25, 2013.

(51) Int. Cl.
*H04N 5/378* (2011.01)

(52) U.S. Cl.
CPC .................................... *H04N 5/378* (2013.01)

(58) Field of Classification Search
CPC ....... H04N 5/378; H04N 5/335; H04N 3/155; H03M 1/00; H03M 1/12; H03M 1/14; H03M 1/1215; H03M 1/06; H03M 1/001; H04M 1/06

See application file for complete search history.

(56) References Cited

U.S. PATENT DOCUMENTS

| | | | | |
|---|---|---|---|---|
| 5,920,274 | A  * | 7/1999 | Gowda et al. | 341/155 |
| 7,576,196 | B2 * | 8/2009 | Khvorova et al. | 536/24.5 |
| 2004/0246154 | A1* | 12/2004 | Aeby et al. | 341/138 |
| 2007/0080842 | A1* | 4/2007 | Kawahito | 341/155 |
| 2009/0303358 | A1* | 12/2009 | Kawahito | 348/255 |

* cited by examiner

*Primary Examiner* — Luong T Nguyen

(74) *Attorney, Agent, or Firm* — David V. Rossi; Frommer Lawrence & Haug LLP

(57) ABSTRACT

Methods and systems for analog-to-digital conversion applicable to an image sensor, such as a CMOS image sensor, in which pixels can be readout non-destructively, and wherein a non-destructive pixel read may be used to provide a coarse analog-to-digital conversion such that information can be stored, and the stored information is then applied in a fine analog-to-digital conversion during a subsequent actual pixel read.

14 Claims, 4 Drawing Sheets

ANALOG-TO-DIGITAL CONVERSION FOR IMAGE SENSOR WITH NON-DESTRUCTIVE READ PIXEL

RELATED APPLICATIONS

This application claims the benefit of U.S. Provisional Application No. 61/816,128, filed Apr. 25, 2013, which is hereby incorporated herein by reference in its entirety.

BACKGROUND

Some embodiments of the present invention relate to analog-to-digital conversion and image sensors and, more particularly, to methods and systems for analog-to-digital conversion applicable to an image sensor, such as a CMOS image sensor, in which pixels can be readout non-destructively.

In some image sensors, conditional reset of a pixel is used to increase dynamic range of the pixel. For instance, a first non-destructive read of the pixel is performed to determine if the pixel signal has exceeded a threshold. If this conditional reset is met (i.e., the pixel output exceeds the threshold), then the pixel output value would be converted to a digital value that would be stored, and the pixel would be reset to restart integration.

If the conditional reset is not met (i.e., the pixel output does not exceed the threshold), then the pixel would continue to integrate as-is, without conversion (and storage) of the pixel value from the first non-destructive read. That is, the pixel would not be reset before being subsequently read. In some image sensors, only one such subsequent read during the same integration time may be permitted (i.e., the pixel output value from this one subsequent read would be converted to a digital value that would be stored, and the pixel would be reset to restart integration), whereas some image sensors may be designed to permit more than one possible subsequent non-destructive read (e.g., until the reset condition is met, or a certain number of reads is performed, whichever occurs first) before conversion of the pixel value, storage of the digital value, and resetting the pixel to restart the integration period for the pixel.

SUMMARY OF SOME EMBODIMENTS

In accordance with some embodiments of the present disclosure, a non-destructive read may be used to provide a coarse ADC conversion such that information can be stored, and the stored information is then applied in a fine ADC conversion during a subsequent actual pixel read (e.g., when the conditional reset is met and/or when a predetermined number of reads have been carried out, depending on the implementation) corresponding to the same integration period as the non-destructive read.

For clarity and ease of reference, as used herein, an "actual read" refers to a destructive read of the pixel (e.g., a read of the pixel associated with then resetting the pixel), representing the final pixel value read for a given integration period. It may be understood, however, that the actual read may be implemented in the same manner as a non-destructive read, except for being followed by a pixel resetting operation. As may be appreciated, an illustrative feature that may be associated with such embodiments, is that by performing a coarse conversion before the actual read, it reduces the time needed to convert the analog pixel value to N-bits (i.e., the conversion time of the actual pixel read) compared to performing the entire conversion (i.e., generating all N-bits) after the actual read.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provide one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein.

DETAILED DESCRIPTION OF SOME EMBODIMENTS

Figure 1:
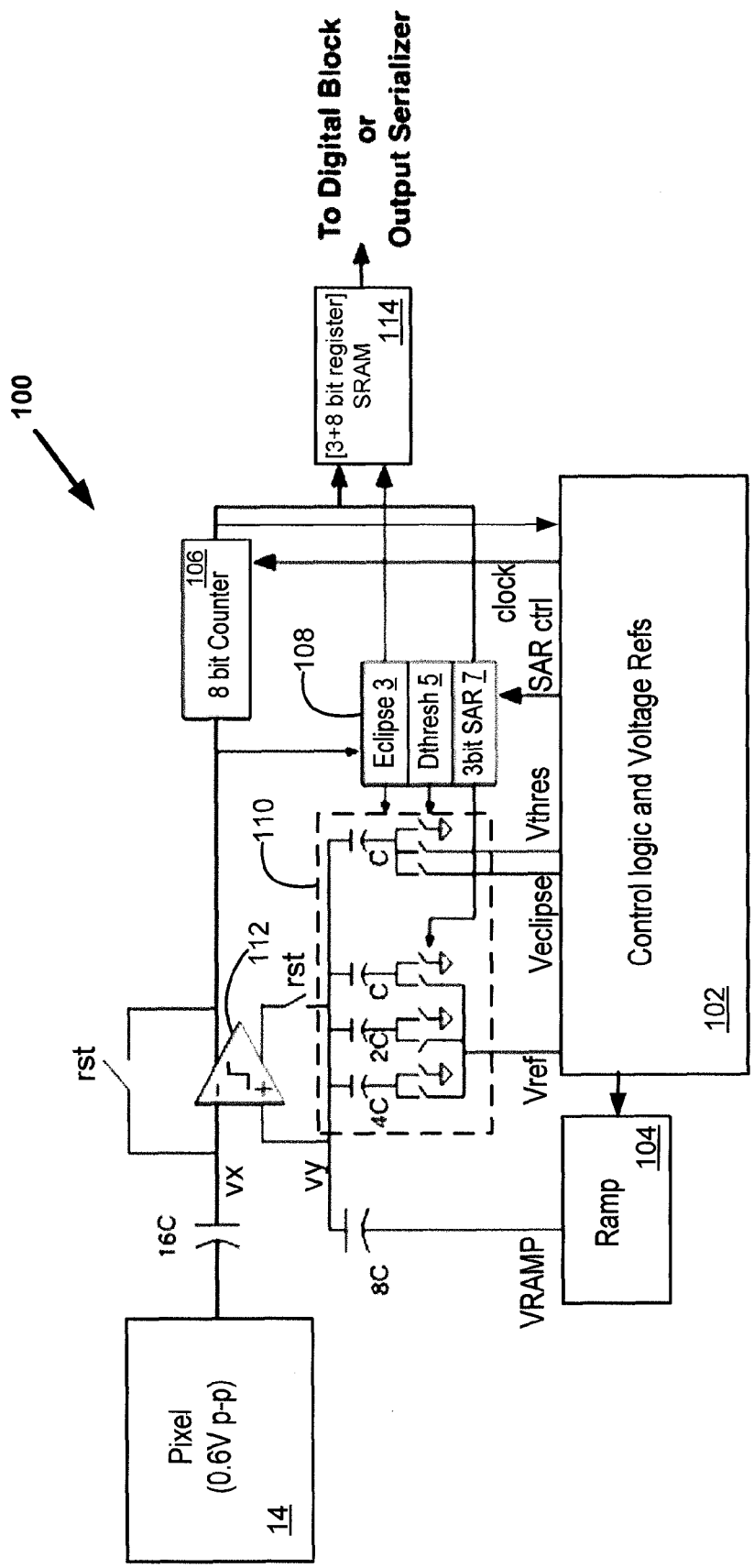
FIG. 1 shows a schematic block diagram of an illustrative hybrid ADC architecture that may be implemented in the readout chain of a CMOS image sensor to provide a two-step conversion with a coarse conversion of a non-destructive read and a fine conversion of a subsequent actual read, in accordance with some embodiments of the present disclosure.

Throughout the description and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled" refers to being coupled via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., control line) said to be coupled to the gate of a transistor may refer to the conductor being operable to control the gate potential so as to control the operation of the transistor (e.g., switching the transistor between "on" and "off" states), regardless of whether the conductor is connected to the gate indirectly (e.g., via another transistor, etc.) and/or directly.

As used herein, the terms "pixel" and "pixel circuit" in the context of an image-sensor pixel array refer to a picture element unit cell containing a photosensor and associated circuitry for converting photons incident on the photosensor into an electrical signal and coupling the electrical signal to circuitry external to the pixel array for discerning the photons detected by the photosensor. And, as indicated above, as used herein, an "actual read" refers to a destructive read of the pixel (e.g., a read of the pixel associated with the resetting of the pixel), representing the final pixel value read for a given integration period. It may be understood, however, that the actual read may be implemented in the same manner as a non-destructive read, except for being followed by a pixel resetting operation.

It is further noted, that the terms "reset," "resetting" (or variations thereof) will be understood by those skilled in the art according to context. For example, in some contexts such terms may refer to resetting the potential of a pixel's photo-charge integration/accumulation region (e.g., within a photodiode) so as to, for example, initiate an integration period. Also by way of example, in some contexts involving pixels having floating diffusion regions, such terms may refer to resetting the potential of a pixel's floating diffusion region, without necessarily also concurrently resetting the pixel's photo-charge integration/accumulation region.

Briefly, as will be further understood from the ensuing disclosure, in accordance with some embodiments of the present disclosure, a non-destructive read may be used to provide a coarse ADC conversion such that information can be stored, and the stored information is then applied in a fine ADC conversion during a subsequent actual pixel read (e.g., when the conditional reset is met and/or when a predetermined number of reads have been carried out, depending on the implementation) corresponding to the same integration period as the non-destructive read. And, as may be appreciated, an illustrative feature that may be associated with some embodiments is that by performing a coarse conversion before the actual read, the time needed to convert the analog pixel value to N-bits (i.e., the conversion time of the actual pixel read) is reduced compared to performing the entire conversion (i.e., generating all N-bits) after the actual read.

FIG. 1 shows a schematic block diagram of an illustrative hybrid ADC architecture that may be implemented in the readout chain of a CMOS image sensor to provide a two-step conversion with a coarse conversion of a non-destructive read and a fine conversion of a subsequent actual read, in accordance with some embodiments of the present disclosure. As further described below, in this illustrative implementation, a Coarse conversion on a non-destructive read is performed using a 3-bit successive-approximation-register (SAR) ADC, and a Fine conversion on a subsequent, actual read is performed with a RAMP ADC to provide 8 bits, of which the most significant bit overlaps with the least significant bit of the Coarse conversion, thereby generating an 11-bit digital output for providing a 10-bit resolution of the analog signal.

It will be understood, however, that this embodiment is merely illustrative and subject to many variations. For example, in various embodiments coarse conversion may be configured to provide a different number of most-significant bits (and, similarly, fine conversion may be configured to provide a different number of least-significant bits). In addition, the Coarse and Fine conversion operations may be implemented using any combination of myriad ADC configurations. For instance, the Coarse conversion can be implemented as any type of ADC circuitry, such as Flash, SAR, Single Slope, or Cyclic ADC circuitry. Similarly, the Fine conversion can be implemented as any type of ADC circuitry, such as Flash, SAR, Single Slope, or Cyclic ADC circuitry. In view of the present disclosure, those skilled in the art will understand the design issues and considerations (e.g., advantages, disadvantages, tradeoffs, such as with respect to speed, power, noise, chip real estate, etc.) in using various types of ADCs for implementing two-step analog-to-digital conversion with coarse conversion of a non-destructive read in accordance with embodiments of the present invention.

More specifically, as shown in FIG. 1, hybrid ADC 100, which is shown coupled to a pixel 14 of an image sensor pixel array, comprises a comparator 112 with its inverting input coupled to pixel 14, a binary weighted capacitor bank 110, output storage (e.g., memory/latches) implemented as SRAM 114 (comprising a register for storing 3 coarse and 8 fine bits), an 8 bit counter 106 (used for RAMP ADC), a ramp generator 104 (used for RAMP ADC) coupled to the non-inverting input of comparator 112, SAR registers and switch control logic 108, and control logic and voltage reference circuitry 102.

As shown, SAR registers and switch control logic 108, which receives the output from comparator 112, includes Eclipse register 3, Dthresh register 5, and 3 bit SAR register 7, which are operable in controlling switch states of capacitor bank 110. Control logic and Voltage Refs circuitry 102 provides the overall control and reference signals (e.g., voltage references) to operate hybrid ADC 100 as a SAR ADC and as a RAMP ADC two-step conversion with a coarse conversion of a non-destructive read and a fine conversion of a subsequent actual read, as further described below.

As shown, the "top" plates of capacitor bank 110 are coupled to an analog non-inverting input of comparator 112, and the voltage signal on that input is represented as signal vy, while the voltage signal on the analog inverting input of comparator 112 is represented as signal vx. In this embodiment, the "bottom" plates of each of the 3-bit resolving capacitors of capacitor bank 112 are selectively switchable between voltage references Vref and ground potential. Capacitor bank 110 also includes another capacitor that is selectively switchable between three voltages: Vrefsun, Vth, and ground potential. Simply by way of non-limiting example, in some implementations, the value of capacitance C may be about 6 femto-Farads (fF). Two reset switches rst are configured for selectively resetting the comparator 112 and may be used for auto-zeroing to eliminate offset (for ease of reference, a switch and its control signal may be identified herein by a common reference character; as such, two reset switches (e.g., reset switches rst) driven by the same control signal ("rst") may be referred to by the same reference character).

As noted, in this illustrative embodiment, pixel 14 is coupled to the inverting input of comparator 112. By way of non-limiting example, for purposes of clarity of exposition, in this embodiment pixel 14 is shown as providing a maximum peak-to-peak voltage signal of 0.6 V (corresponding to full-well capacity). Pixel 14 may be implemented in a various ways (e.g., the precise configuration or implementation of pixel 14 is not important; e.g., the pixel can be of different types including CTIA, Buffered direct injection (BDI), Direct injection, etc.), provided that pixel 14 is configured such that it can be selectively read non-destructively; for example, the pixel may be readout to provide a signal (e.g., voltage signal) representing the photocharge integrated/accumulated in the pixel, without such readout impacting the pixel in a way that would prevent it from being accurately subsequently actually readout during the same integration period. Thus, for example, in some embodiments, nondestructive readout does not prevent the pixel from continuing to integrate photocharge that adds to the photocharge corresponding to the nondestructive readout (e.g., the pixel is not reset between a nondestructive readout and a subsequent actual readout, and the actual readout accurately represents the integrated photocharge over the integration period in accordance with embodiments of the present invention).

It will be understood by those skilled in the art that the functional block diagram of FIG. 1 is merely illustrative, and that ADC 100 may be implemented in myriad ways according to various designs that may combine and/or partition functionality and/or physical components (such as those represented in FIG. 1) in myriad ways, in accordance with embodiments of the present invention. Simply by way of example, logic 108 may be logically and/or physically included within control logic and voltage refs 102; representing these as separate blocks does not necessarily require that they are logically and/or physically separate and/or only communicate via SAR ctrl signal. In addition, those skilled in the art will understand that for ease of reference and clarity of exposition, FIG. 1 does not show all components (e.g., sample-hold circuitry, programmable gain amplifiers, other analog signal chain components, additional latches, signaling interfaces to other image sensor and external control components, etc.) that those skilled in the art may employ in implementing the depicted illustrative embodiment or various other embodiments of the present invention.

Figure 2:
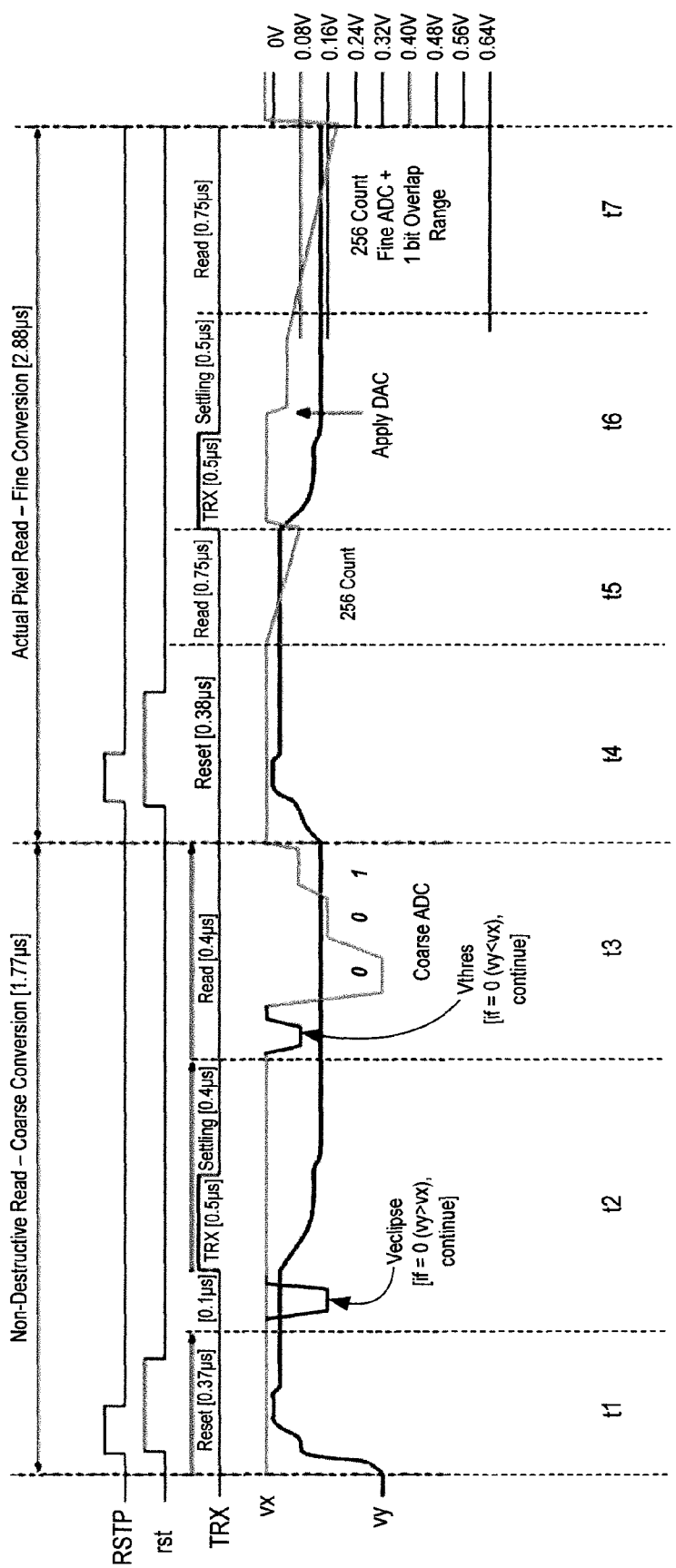
FIG. 2 shows an illustrative simplified timing diagram corresponding to operation of the ADC architecture of FIG. 1, in accordance with some embodiments.

Referring now to FIG. 2, operation of the ADC 100 as configured to provide coarse conversion of a non-destructive read and fine conversion of an actual read for a given pixel readout is described, in accordance with some embodiments. More specifically, FIG. 2 shows an illustrative simplified timing diagram corresponding to operation of the ADC architecture of FIG. 1, where the conversion is split into two separate conversions, namely, a Coarse Conversion of a non-destructive read and a Fine Conversion of an actual pixel read. It is noted that for clarity of exposition by way of non-limiting example, time periods for various operations are identified in brackets (e.g., the coarse conversion time period is shown as 1.77 µs; the first reset operation time period is shown as 0.37 µs, etc.); neither absolute or relative times should be considered as being limited by such illustrative time periods.

As indicated above, the present illustrative embodiment is provided to illustrate various principles of the A/D conversion operation and is not predicated upon specific pixel design, provided the pixel provides for non-destructive readout. As such, signal nomenclature and specific signaling relating to pixel control signals (namely, RSTP and TRX) as shown in FIG. 2 does not imply a particular pixel circuit type but more generally represents functional operations generally relating to reading out a pixel that provides for non-destructive read and may provide, in this embodiment, for correlated double sampling (CDS). For example, as will be further understood from the ensuing disclosure, RSTP is related to the operation of resetting a node in the pixel such that a reset type of level can be read to provide for CDS. Thus, for example, RSTP may represent one or more signals and does not necessarily imply a 4T type pixel. Similarly, TRX is related to the operation of reading out a signal representing the photocharge integrated/accumulated in the pixel, and TRX may thus represent one or more signals, and does not necessarily imply a 4T-type pixel.

After pixel 14 has been reset and integrating charge for a given period of time, it is selected for non-destructive readout. More specifically, during time interval t1, a reset signal RSTP is applied to reset—not the pixel's charge integration/accumulation node (e.g., its photodiode well potential)—but the pixel's output charge collection node (e.g., a floating diffusion). Accordingly, voltage vy is shown as being pulled-up, reflecting the pixel charge collection node charging to the reset potential. Also during t1, the comparator is reset by applying reset signal rst.

The illustrative embodiment provides for eclipsing distortion detection. Accordingly, during the beginning of interval t2, with signal vy equal to the reset voltage, DAC capacitor bank 110 is controlled to provide an eclipse reference voltage (Veclipse) as signal vy, for comparison with the reset level. If the reset voltage level is greater than Veclipse (i.e., vx>vy), then coarse conversion operation continues. It will be understood by those skilled in the art that in various embodiments, different actions can be taken if eclipsing is detected. For example, anti-eclipsing circuitry can be invoked. Alternatively, a flag indicative of the pixel eclipsing may be written into SRAM 114.

If no eclipsing is detected, then during interval t2 a transfer signal TRX applied to the pixel 14 causes non-destructive readout of a signal representing the integrated photocharge. As such, voltage signal vy is shown decreasing while TRX is asserted. In this illustrative embodiment, interval t2 includes a settling period following the non-destructive readout interval. As will be understood by those skilled in the art, in some embodiments, this settling period may be decreased in duration or eliminated in view of the beginning of interval t3 including a threshold detection interval.

More specifically, at the beginning of read interval t3, DAC capacitor bank 110 is controlled to provide a threshold voltage reference (Vthres) as signal vy, for comparison with the signal level of the non-destructive readout. If vx is greater than vy (i.e., if the "size" of the non-destructive readout signal is not large enough), the comparator and counter may be disabled such that no coarse conversion is performed. If, however, vx is less than vy (i.e., the "size" of the non-destructive readout signal is large enough), the coarse conversion operation continues. As shown, during interval t3, ADC 100 is operated as a SAR ADC to sequentially resolve three bits according to controlling the capacitor bank to switch the binary-scaled capacitors, one capacitor at a time, between the two reference levels, in the typical successive approximation timing, to provide charge redistribution according to the comparison between vx and vy. As shown, in this example, coarse ADC resolves the coarse bits as 001 (i.e., MSB=0,

[MSB−1]=0, [MSB−2]=1). The coarse bits are stored (e.g., in circuitry 108 and/or in SRAM 114) for subsequent use during the actual pixel read period.

It is noted that in this illustrative embodiment, with 0.6 V p-p maximum pixel signal, three coarse bits, 8 fine bits, and 10 bit ADC resolution, the non-destructive read signal value must be within 80 mV of the final (actual) pixel value for the coarse conversion to be valid.

During interval t4, the pixel and comparator are reset, in a manner similar to interval t1. Then, in interval 5, hybrid ADC 100 is controlled to operate as a RAMP ADC, with RAMP generator 100 (driven based on counter 106) coupling a ramp voltage signal VRAMP to drive voltage vy to provide convert the pixel reset signal to an 8-bit digital value that may be used for purposes of correlated double-sampling.

Then, during interval t6 a transfer signal TRX applied to the pixel 14 causes actual readout of a signal representing the integrated photocharge. As such, voltage signal vy is shown decreasing while TRX is asserted. It is understood that this actual readout signal represents the photocharge corresponding to the nondestructive read, plus additional photocharge integrated from the time of the nondestructive read until the actual readout. In this illustrative embodiment, the actual readout timing may be the same as the preceding nondestructive readout timing; however, the actual pixel readout may be a destructive readout in the sense that the pixel will be reset following this readout. In this illustrative embodiment, interval t6 includes a settling period following the non-destructive readout interval.

Also during interval t6 in this embodiment, as shown, following actual signal readout (i.e., following de-assertion of TRX), the stored coarse bits are applied to the DAC capacitor bank to drive vx to an analog voltage corresponding to the nondestructive read pixel signal (within the residual, representing the difference between the nondestructive signal and vx at the end of the coarse conversion interval t3). More specifically, the voltage vx during interval t6, after applying the coarse bits to the DAC, will equal the voltage vx at the end of the coarse conversion during interval t3. And, as noted above, this voltage vx, in accordance with this illustrative embodiment, should be within 80 mV of the final actual voltage.

As shown, near or at the end of interval t6 and continuing into t7, hybrid ADC 100 is controlled to operate as a RAMP ADC, with RAMP generator 100 (driven based on counter 106) coupling a ramp voltage signal VRAMP to drive voltage vy to provide a fine comparison, resolving the signal to 8 bits, including one redundant bit (i.e., the most significant bit of the fine bits, corresponding to the least significant bit of the coarse bits). As understood by those skilled in the art, gain may be achieved by changing the slope of the RAMP and the voltage on Vref during actual pixel readout conversion. As understood by those skilled in the art, in some embodiments, prior to applying the RAMP ADC for the fine conversion, the 8-bit digital value for the pixel reset signal determined in interval t5 may be applied to adjust the count value of counter 106 such that correlated double sampling is effected for the fine conversion of the actual pixel read.

With the fine conversion complete, the fine bits may then also be written to SRAM 114 for the pixel. The 11 bits generated by the two-step coarse and fine conversion may be subsequently provided for processing (e.g., via output serializer or digital block) to provide an actual pixel value represented with 10 bit resolution.

As may be appreciated, an illustrative feature that may be associated with ADC in accordance with the illustrative embodiment represented by FIG. 2 is that by performing a coarse conversion before the actual read, the conversion time of the actual pixel read is reduced compared to performing the entire conversion after the actual read. It may further be understood that another feature associated with some embodiments based on the illustrative embodiment of FIG. 2 is that by employing either or both of the different comparisons, Eclipse detection and/or Vthreshold, initially during a nondestructive read phase, such that if these comparisons were not satisfied, then the conversion for that pixel would not continue and the ADC power would be dynamically shut-down, a significant reduction in power consumption is enabled based on the reduction in the number of ADCs that require a complete conversion.

Figure 3:
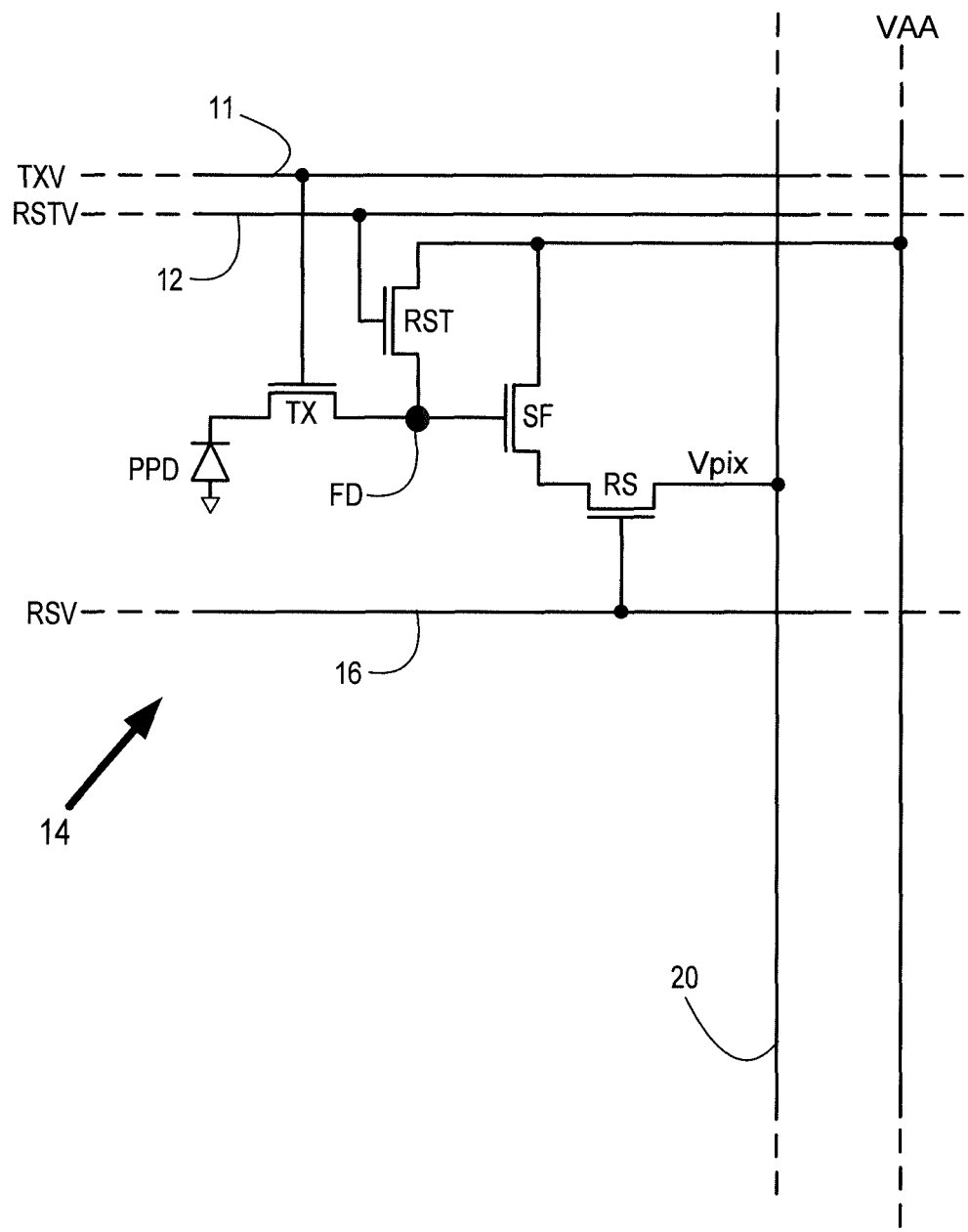
FIG. 3 schematically depicts an illustrative pixel circuit, in accordance with some embodiments.

FIG. 3 schematically depicts a pixel circuit 14, which in this illustrative embodiment is shown as a 4T type pixel circuit that includes a photosensor (configured, in this embodiment, as a pinned photodiode) PPD, and a transfer transistor TX controlled by transfer signals TXV applied to transfer control lines 11 that is coupled to the gate of transfer transistors TX. The pixel also comprises a readout circuit that includes a charge storage region configured as floating diffusion region FD, a source follower transistor SF, a row-select transistor RS controlled by a row select signal RSV applied to row select control line 16 that is coupled to the gate of row-select transistor RS, and a reset transistor RST controlled by a reset signal RSTV applied to reset control line 12 that is coupled to the gate of reset transistor RST.

Photosensor PPD, shown as connected between a potential Vss (e.g., substrate potential, which may be at ground) and the transfer transistor TX, is conductively coupled to the floating diffusion region FD when the transfer transistors TX is activated by transfer control signals TXV. Thus, photocarriers (e.g., electrons) generated by photosensor PPD may be selectively transferred to the floating diffusion region FD in response to the transfer control signals TXV.

As illustrated, the collection or floating diffusion region FD is electrically connected to the gate of a source follower transistor SF, the output of which is selectively applied to the column line 20 by row select transistor RS as pixel voltage Vpix. The reset transistor RST selectively resets the collection or floating diffusion region FD to a predetermined voltage by coupling a voltage VAA to the collection or floating diffusion region FD during a reset period which precedes or follows a charge accumulation or integration period.

The source follower transistor SF is connected between the array pixel supply voltage VAA and the row select transistor RS, and converts the charge stored at the floating diffusion region FD into an electrical output signal.

The row select transistor RS is controllable via row select line 16 by row select signal RSV for selectively outputting the electrical output signal from the source follower transistor SF onto column line (e.g., bus) 20, which is coupled to readout circuitry (not shown in FIG. 3) that is disposed external to the pixel array and may include, for example, a current sink load transistor, and sample and hold circuitry for each column bus. As understood by those skilled in the art, such sample and hold circuitry which may be provided for each column bus is typically configured for sampling the reset level as well as the signal level (e.g., in order to provide for correlated-double-sampling CDS). That is, in connection with readout of a pixel, two output signals may be generated, one being a reset signal generated after the floating diffusion region is reset, the other being a signal level representing an image or photo signal generated after charge is transferred from the photosensor(s) to the floating diffusion region. The reset level and signal level output signals may be selectively stored in the sample and hold circuit based on respective reset select and signal select signals applied to the sample and hold circuitry.

In operation, a row select transistor RS is activated by row select signal RSV on line 16 and connects the imager pixel 14 to a column line 20. A reset transistor RST is typically turned on by a reset signal RSTV on line 12 and the floating diffusion region FD is reset to a predetermined voltage (eg., VAA). Integration of incident photons and accumulation in PD of photo-electrons generated from the photons is conducted at least during the reset period and prior to the application of a transfer gate voltage signal TX. The transfer gate voltage signal TXV applied on line 11 to transfer gate TX is then clocked ON to cause the accumulated charge in the PPD to transfer to the floating diffusion region FD, which functions as a charge collection region.

As will be understood by those skilled in the art, in some embodiments, a 4T pixel circuit such as that shown in FIG. 3 may be employed as a non-destructive pixel, employing a timing diagram similar to the timing diagram shown in FIG. 2 (e.g., using RSTP for RSTV, and TRX for TXV), but, for example, eliminating the reset pulse RSTP during t4 and eliminating the corresponding read interval t5. In this way, charge transferred to the floating diffusion during t6 will add to the charge transferred to the floating diffusion during t2. Such an embodiment, however, would not provide for correlated double sampling, but would otherwise still provide for increased dynamic range based on using a non-destructive read, while reducing the time needed to convert the analog pixel value compared to performing the entire conversion only after the actual read.

Figure 4:
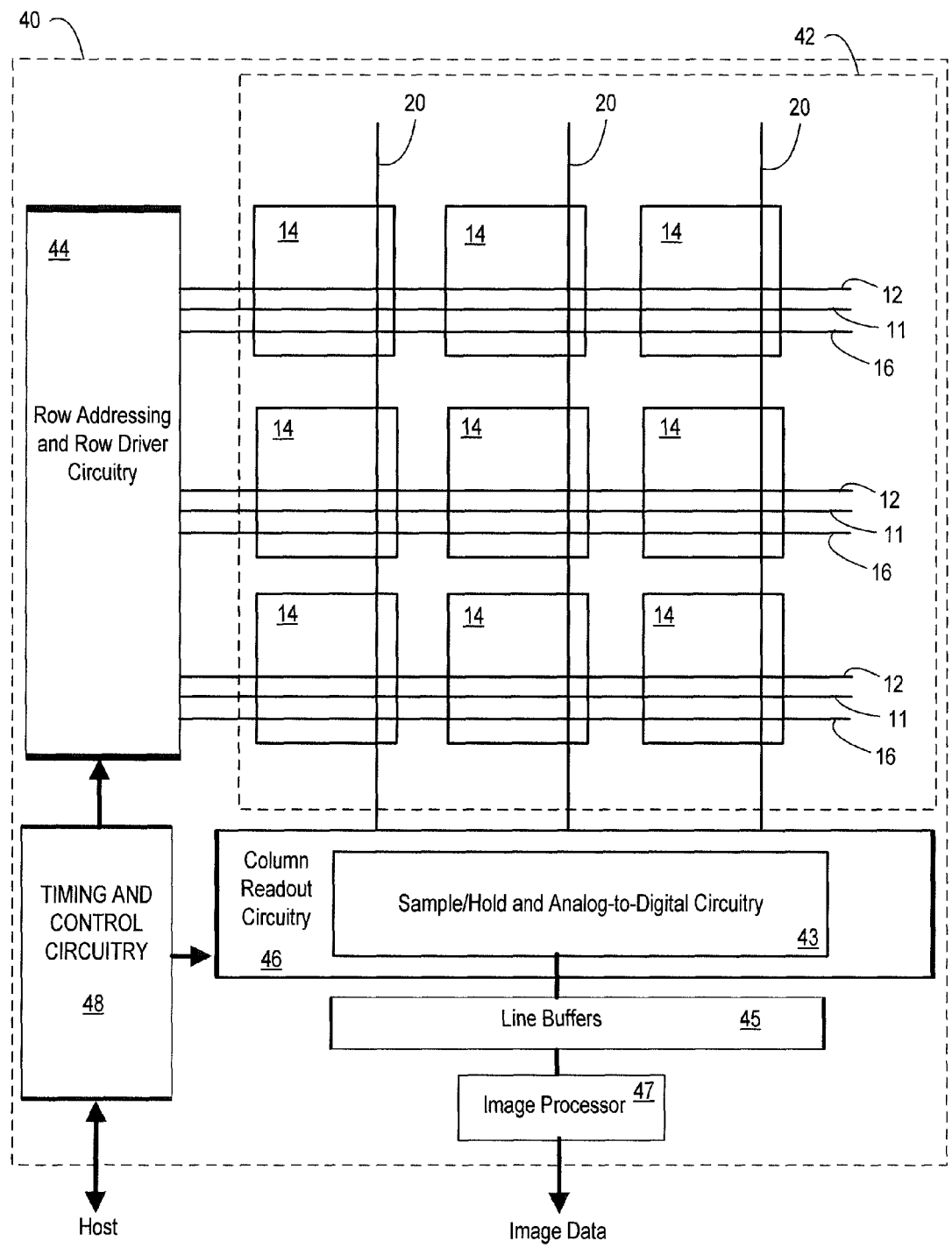
FIG. 4 depicts a block diagram of an illustrative CMOS image sensor architecture that may be used to implement embodiments in accordance with the present disclosure, in accordance with some embodiments.

FIG. 4 depicts a block diagram of an illustrative CMOS image sensor 40 architecture that may be used to implement embodiments in accordance with the present disclosure, such as embodiments employing a two-step readout architecture providing a coarse conversion on a non-destructive read followed by a fine conversion on an actual read, in accordance with embodiments described hereinabove in connection with FIGS. 1 and 2. As well known, pixel array 42 typically includes a large number of pixels arranged in an M×N array; however, CMOS image sensor 40 is shown as including a simplified pixel array 42 comprising a three by three array of pixels 14, which, for ease of discussion, is a 4T pixel circuit in this embodiment (e.g., as per FIG. 3), but may be any of a variety of pixel circuit types that provide for non-destructive reading.

Row Addressing and Row Driver Circuitry 44 generates transfer gate control signals on lines 11, row select signals on lines 16, an reset gate control signals on lines 12. Column Readout Circuitry 46 includes analog to digital circuitry 43 for sampling and digitizing output values readout from the pixel array 42. Particularly, circuitry 43 may be implemented to comprise a plurality of A/D converters configured to implement column parallel readout, and each of the A/D converters may be implemented to provide two-step conversion in accordance with embodiments of the present invention, such as the illustrative embodiments described with reference to FIGS. 1 and 2. In some embodiments, the circuitry 43 may be configured such that the readout circuitry associated with each column bus 20 may have a respective analog to digital converter (ADC), though in some embodiments pairs of columns may share an ADC.

Timing and control circuitry 48 controls both the row addressing and row driver circuitry 44 and the column readout circuitry 43. For instance, timing and control circuitry controls the row addressing and row driver circuitry 44 for selecting the appropriate row for readout, and may, for example, provide timing control signals in accordance with rolling shutter readout or global shutter readout. As indicated in FIG. 4, timing and control circuitry 48 may also communicably interface with a host (e.g., a processor associated with a system comprising the image sensor), which may, for example, in some implementations, specify various control information.

As schematically depicted, signals on column buses 20 are sampled and digitized by circuitry 43, and the digitized pixel values provided by the ADCs may be provided to line buffers 45, which may be used to temporarily store digital signals from circuitry 43 for use by image processor 47. In general, any number of line buffers 45 may be included and, for example, each line buffer may be capable of storing digital signals representative of the charge signals that may be read from each pixel in a given row of pixels in the pixel array 42. Image processor 47 may be used to process the digital signals held in line buffers 36 to produce output image data that may be provided to a device external to the image sensor 40.

As may be appreciated, there are many possible alternative implementations of an image sensor architecture that may embody ADC in accordance with some embodiments of the present disclosure, such as a two-step readout architecture providing a coarse conversion on a non-destructive read followed by a fine conversion on an actual read, in accordance with embodiments described hereinabove in connection with FIGS. 1 and 2. By way of example, it will be understood that circuitry 46 may be divided into two portions provided at the top and bottom of the pixels array.

It will be understood from the foregoing, that myriad variations and additional or alternative embodiments may be implemented without departing from the scope of the present disclosure. For example, by way of non-limiting, illustrative example, it will be understood that various embodiments of the present invention include, but are not limited to, any Multi-step ADC that does a Coarse conversion on a non-destructive pixel read and then a Fine Conversion on a separate actual pixel read.

In addition, the result of the coarse conversion can be stored in various ways for subsequent application to the Fine Conversion; for example the result of the coarse conversion can be stored as an analog voltage and/or a digital DAC value that is then applied to the Fine Conversion.

Further, it will be understood that in some embodiments, pipelining of the Coarse conversion and the Fine Conversion can be achieved by using a separate comparator and additional pixel readout lines to reduce overall conversion time. For instance, while an ADC is performing Fine Conversion on a first pixel, the ADC can be performing Coarse conversion for a second pixel.

It will also be understood in view of the foregoing that in some embodiments, where during an integration time two or more non-destructive reads are carried out before an actual read, a respective conversion corresponding to the same most-significant bit(s) may be carried out for each non-destructive read, and only information from the non-destructive read immediately preceding the actual read may be applied in a fine ADC conversion during the actual pixel read. As such, in some embodiments, conversion may be implemented in two conversion steps corresponding to two respective reads from among two or more reads during the same integration period. In some implementations, no more than two reads, namely, a non-destructive read and an actual read, may be carried out during the same integration period.

In some embodiments, where during an integration time two or more non-destructive reads are carried out before an actual read, respective conversions corresponding to successive sets (each of at least one bit) in decreasing order of significance (starting with most-significant) may be carried out for each non-destructive read, and information from each of nondestructive read may be applied in the conversion during the subsequent nondestructive read, and information from the non-destructive read immediately preceding the actual read may be applied in a fine ADC conversion during the actual pixel read. As such, in some embodiments, conversion may be implemented in more than two conversion steps corresponding to respective reads during the same integration period.

And it will further be understood in view of the foregoing that in some embodiments of the present disclosure, an image sensor, such as a CMOS image sensor, comprises (i) an array of pixels that are each capable of being read non-destructively, and (ii) an analog-to-digital converter (ADC) that is configured for converting an analog pixel signal being integrated by a selected pixel of the pixel array into an N-bit digital signal, by performing at least (a) a coarse conversion on a read of the selected pixel to determine m most-significant bits (m<N) of the N-bit digital signal, and (b) a fine conversion based on a temporally-subsequent separate read of the selected pixel to determine the n least-significant bits (n+m≤N), wherein the pixel is not reset between the read and the separate read of the pixel, such that the analog pixel signal being integrated between the read and the separate read is not destroyed.

In some embodiments, n+m=N; that is, the coarse conversion and the fine conversion are combined to provide the full conversion of the actual pixel value. In other words, some embodiments of the present disclosure comprise a 2-Step ADC that uses the non-destructive read of a pixel as a coarse conversion followed by an actual pixel read for the fine conversion. Further, some embodiments are directed to an image sensor that includes such a 2-Step ADC. It will also be understood that in, for example, such embodiments comprising a 2-Step ADC, the fine conversion may be performed on a signal corresponding to the difference between the subsequent read (e.g., the actual read) and the read used for the coarse conversion.

In view of the foregoing, those skilled in the art will also understand that some embodiments relate to an image sensor, such as a CMOS image sensor, that is configured to provide for sampling an output signal of a pixel a plurality of times during a time interval after initially resetting the pixel and before again resetting the pixel (i.e., before destroying any signal charge integrated by the pixel), and that includes an analog-to-digital converter (ADC) that is configured to generate an N-bit digital value representing the charge signal integrated in the pixel during the time interval, the analog-to-digital converter being configured to (i) determine m most-significant bits of the N-bit digital value based at least in part on one or more of the pixel output signal samples prior to a final one of the plurality of pixel output signal samples, and (ii) determine n least-significant bits of the N-bit digital value based at least in part on the final one of the plurality of output signal samples during the time interval. In some embodiments, n+m=N.

In addition, consonant with the illustrative embodiments disclosed with reference to FIGS. 1 and 2, those skilled in the art will understand that coarse and fine conversions may provide one, or more than one, overlapping or redundant bits. For example, if K-bit resolution (e.g., 10 bit resolution) is desired, one or more of the least significant bits of the coarse conversion may overlap with one or more of the most significant bits of the fine conversion, such that the coarse an fine conversions provide more than K bits. Such redundant bit(s) may be used in post-processing to provide the K bits.

The present invention has been illustrated and described with respect to specific embodiments thereof, which embodiments are merely illustrative of the principles of some embodiments of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that follow.

What is claimed is:

1. A method for analog-to-digital (A/D) conversion of a pixel signal readout of an image sensor pixel, the method comprising:
   performing a coarse A/D conversion of a first signal readout non-destructively from the image sensor pixel, the coarse A/D conversion generating a coarse signal comprising at least one bit, the first signal representing photocharge integrated in the image sensor pixel over a first time interval;
   storing information representing the coarse signal;
   performing, based on the stored information, a fine A/D conversion of a second signal readout from the image sensor pixel, the fine A/D conversion generating a fine signal comprising at least one bit, wherein the second signal represents a combination of the photocharge integrated in the image sensor pixel over the first time interval and photocharge integrated in the image sensor pixel following the non-destructive readout of the first signal; and
   wherein at least one of the at least one bit of the coarse signal has a binary weight that is more significant than the most significant bit of the fine signal, and at least one of the at least one bit of the fine signal has a binary weight less significant than the least significant bit of the coarse signal.

2. The method according to claim 1, wherein the stored information comprises the at least one bit of the coarse information.

3. The method according to claim 1, wherein the coarse signal and the fine signal each comprises a plurality of bits.

4. The method according to claim 3, wherein the coarse signal and the fine signal each comprise at least one bit having the same binary weight.

5. The method according to claim 1, wherein the coarse A/D conversion is performed by a successive-approximation-register (SAR) A/D converter.

6. The method according to claim 5, wherein the fine A/D conversion is performed by a ramp A/D converter.

7. The method according to claim 6, wherein the SAR A/D converter and the ramp A/D converter are configured as a hybrid A/D converter comprising common control circuitry and a common comparator circuit.

8. An image sensor comprising an A/D converter circuit that is configured to execute the method according to claim 1.

9. The image sensor according to claim 8, wherein the A/D converter circuit comprises a charge redistribution successive-approximation-register (SAR) A/D converter comprising a binary-weighted capacitor bank to perform the coarse A/D conversion.

10. The image sensor according to claim 9, wherein the A/D converter circuit comprises a ramp A/D converter to perform the fine A/D conversion.

11. The image sensor according to claim 10, wherein the SAR A/D converter and the ramp A/D converter are configured as a hybrid A/D converter comprising common control circuitry and a common comparator circuit.

12. The image sensor according to claim 11, wherein the coarse signal and the fine signal each comprise at least one bit having the same binary weight.

13. The image sensor according to claim 8, wherein the A/D converter circuit comprises a charge redistribution successive-approximation-register (SAR) A/D converter comprising a binary-weighted capacitor bank to perform the coarse A/D conversion, and wherein the stored information is applied to control the binary-weighted capacitor bank as a digital-to-analog converter to generate an analog voltage corresponding to the stored information.

14. The image sensor according to claim 8, wherein the coarse signal comprise at least two most-significant bits, the fine signal comprises at least 6 least-significant bits, and one bit between the coarse and fine signals has the same binary weight.

* * * * *